(12) United States Patent
Moon et al.

(10) Patent No.: US 7,758,198 B2
(45) Date of Patent: Jul. 20, 2010

(54) BACKLIGHT UNIT AND LIQUID CRYSTAL DISPLAY DEVICE

(75) Inventors: Je Young Moon, Chungcheongnam-do (KR); Do Yune Kim, Gyeongsangbuk-do (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 11/638,228

(22) Filed: Dec. 13, 2006

(65) Prior Publication Data

US 2007/0291471 A1 Dec. 20, 2007

(30) Foreign Application Priority Data

Jun. 15, 2006 (KR) .................. 10-2006-0053887

(51) Int. Cl.
*G09F 13/04* (2006.01)
*F21V 21/00* (2006.01)

(52) U.S. Cl. .............. 362/97.2; 362/97.1; 362/225; 362/217.14; 362/217.16; 362/249.01; 362/260; 362/396

(58) Field of Classification Search .......... 362/225, 362/97, 560, 561, 634, 222, 330, 396, 511, 362/549, 249, 260, 97.1, 97.2, 217.14, 217.16
See application file for complete search history.

(56) References Cited

U.S. PATENT DOCUMENTS

| | | | | |
|---|---|---|---|---|
| 2002/0057405 | A1* | 5/2002 | Morishita et al. | 349/113 |
| 2006/0146512 | A1* | 7/2006 | Choi | 362/29 |
| 2007/0091584 | A1* | 4/2007 | Chang | 362/29 |

FOREIGN PATENT DOCUMENTS

JP 2005-268142 9/2005

OTHER PUBLICATIONS

First Office Action dated Aug. 8, 2008 for Chinese Patent No. 2006101448631.
Second Office Action dated Feb. 6, 2009 for Chinese Patent No. 2006101448631.

* cited by examiner

*Primary Examiner*—Sandra L O'Shea
*Assistant Examiner*—Sean P Gramling
(74) *Attorney, Agent, or Firm*—Brinks Hofer Gilson & Lione

(57) ABSTRACT

A backlight unit for a liquid crystal device are disclosed for improving the brightness of the liquid crystal display. The backlight unit includes a plurality of lamps, a prism reflector, and a plurality of lamp guides. The prism reflector forms a plurality of prism peaks for positioning the plurality of lamps. The plurality of lamp guides fix the plurality of lamps at a predetermined distance apart from each other.

11 Claims, 9 Drawing Sheets

BACKLIGHT UNIT AND LIQUID CRYSTAL DISPLAY DEVICE

RELATED APPLICATIONS

This application claims the benefit of Korean Patent Application No. 53887/2006, filed on Jun. 15, 2006, in the Korean Intellectual Property Office, the disclosure of which is incorporated by reference herein.

BACKGROUND

1. Field of the Disclosure

The present disclosure relates to a backlight unit that improves the assembly of a liquid crystal display (LCD) device and the brightness of the backlight unit in an LCD device.

2. Description of the Related Art

Improvements in the field of LCD devices have resulted in products being manufactured that are smaller, lighter, and include more features and better performance. The cathode ray tube (CRT) had been a common display device in terms of performance and price; however, it suffers from the drawbacks of not being thin and lightweight. Accordingly, the LCD device, due to its small size, thin profile, lighter weight, and lower power consumption is considered as a suitable replacement for the CRT. LCD devices may be installed with several different kinds of data processing devices that require display devices.

Backlights that are used as light sources for LCD devices can generally be divided into two categories—edge-type and direct-type backlights. Edge-type backlights have a lamp unit installed at the side of a waveguide for guiding light. The lamp unit includes a lamp that emits light, lamp holders that insert into and protect each end of the lamp, and a lamp housing enclosing the outside of the lamp and inserting into a side of the waveguide so that it reflects the light emitted by the lamp towards the waveguide. Edge-type backlights with a lamp unit installed on the side of a waveguide may be used for smaller LCD devices, such as in laptop and desktop computers. They have favorable light uniformity, service lives, and are easy to use with a thin LCD device.

The direct-type backlight has become more common as the size of LCD devices began growing to beyond 20 inches. In the direct-type backlight method, a plurality of lamps are arranged in a single row on a lower surface of a diffuser plate to directly emit light from the front of the LCD panel. The direct-type method has an effective use of light, and is more common in large screen LCD devices that require high brightness, when compared to the edge-type method.

FIG. 1 is a perspective view of a direct-type LCD device according to the related art. Referring to FIG. 1, a direct-type LCD device includes an upper substrate with a color filter formed thereon, an LCD panel 105 coupled with a lower substrate forming a thin film transistor (TFT) and pixel electrodes, with a liquid crystal layer interposed between. A guide panel 103 is used for fixing the LCD panel 105.

The direct-type LCD device further includes a backlight unit 150 that emits light from below the LCD panel, a lower cover 120 for storing the backlight unit 150, and an upper cover 101 assembled to the lower cover 120 for protecting the LCD panel 105 and the backlight unit 150. The backlight unit 150 includes a plurality of lamps 113 that emit light, a diffuser plate 108 and light diffuser sheets 107 disposed adjacent the plurality of lamps 113, for diffusing and focusing light, and a reflective plate 117 disposed adjacent the plurality of lamps 113, to reflect light emitted towards the lower cover 120.

An inverter 123 for supplying power is attached to the rear of the lower cover 120, an inverter cover shield 124 is disposed above the inverter 123, and a cover shield 121 is provided to protect the LCD panel 105 and other components from external electrostatic discharge (ESD).

FIG. 2 is perspective view showing lamps fixed by lamp guides according to the related art. Referring to FIG. 2, the plurality of lamps 113 disposed in the backlight unit of a direct-type LCD device are fixed in groups of three by the lamp guides 109. A lamp guide 109 includes a base plate 109a on which the lamps are directly fixed by grips 109b formed a predetermined distance apart from each other. A spacer or support 109c is formed between the grips 109b to keep the diffuser plate and the light diffuser sheets located above the lamps 113 a predetermined distance away. A plurality of the above-structured lamp guides 109 may be installed through the reflective plate 117 and lower cover (not shown).

However, due to a trend of slimming direct-type LCD devices, darker regions may occur between lamps, and it may be difficult to obtain uniform brightness. Also, with the slimming of LCD devices, the lamp guides fixing the lamps can sometimes be visually seen, reducing the quality level of the display output in the eyes of a consumer.

BRIEF SUMMARY

Accordingly, the present disclosure is directed to a backlight unit and an LCD device that substantially obviate one or more problems due to limitations and disadvantages of the related art.

In a first aspect, a backlight unit includes a plurality of lamps. A prism reflector includes a plurality of prism peaks for positioning the plurality of lamps. Finally, a plurality of lamp guides holds the plurality of lamps at a predetermined distance apart from one another.

In a second aspect, a backlight unit includes a plurality of lamps. A prism reflector is coupled with a plurality of prism peaks for arranging the plurality of lamps. A plurality of lamp guides are coupled with and disposed integrally on the prism reflector.

In a third aspect, a liquid crystal display device includes a liquid crystal display panel and a plurality of lamps coupled with the liquid crystal display panel. A prism reflector includes a plurality of prism peaks for arranging the plurality of lamps. A plurality of lamp guides fix the plurality of lamps at a predetermined distance from one another.

In a fourth aspect, a liquid crystal display device includes a liquid crystal display panel and a plurality of lamps coupled with the liquid crystal display panel. A prism reflector comprises a plurality of prism peaks configured to arrange at least one of the plurality of lamps. The prism reflector further comprises a plurality of lamp guides disposed integrally on the prism reflector.

In a fifth aspect, a liquid crystal display device includes a liquid crystal display panel and a plurality of lamps coupled with the liquid crystal display panel. The plurality of lamps are configured to provide light for the liquid crystal display device. A prism reflector is coupled with the plurality of lamps and configured to reflect the light from the plurality of lamps. The prism reflector includes declined surfaces configured to separate individual lamps of the plurality of lamps.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects are discussed below in conjunction with the embodiments. It is to be understood that both the foregoing general description and the following detailed description of the present invention are exemplary and explanatory and are intended to provide further explanation of the invention as claimed.

BRIEF DESCRIPTION OF THE DRAWINGS

The system and/or method may be better understood with reference to the following drawings and description. Non-limiting and non-exhaustive embodiments are described with reference to the following drawings. The components in the figures are not necessarily to scale, emphasis instead being placed upon illustrating the principles of the invention. In the figures, like referenced numerals designate corresponding parts throughout the different views. The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
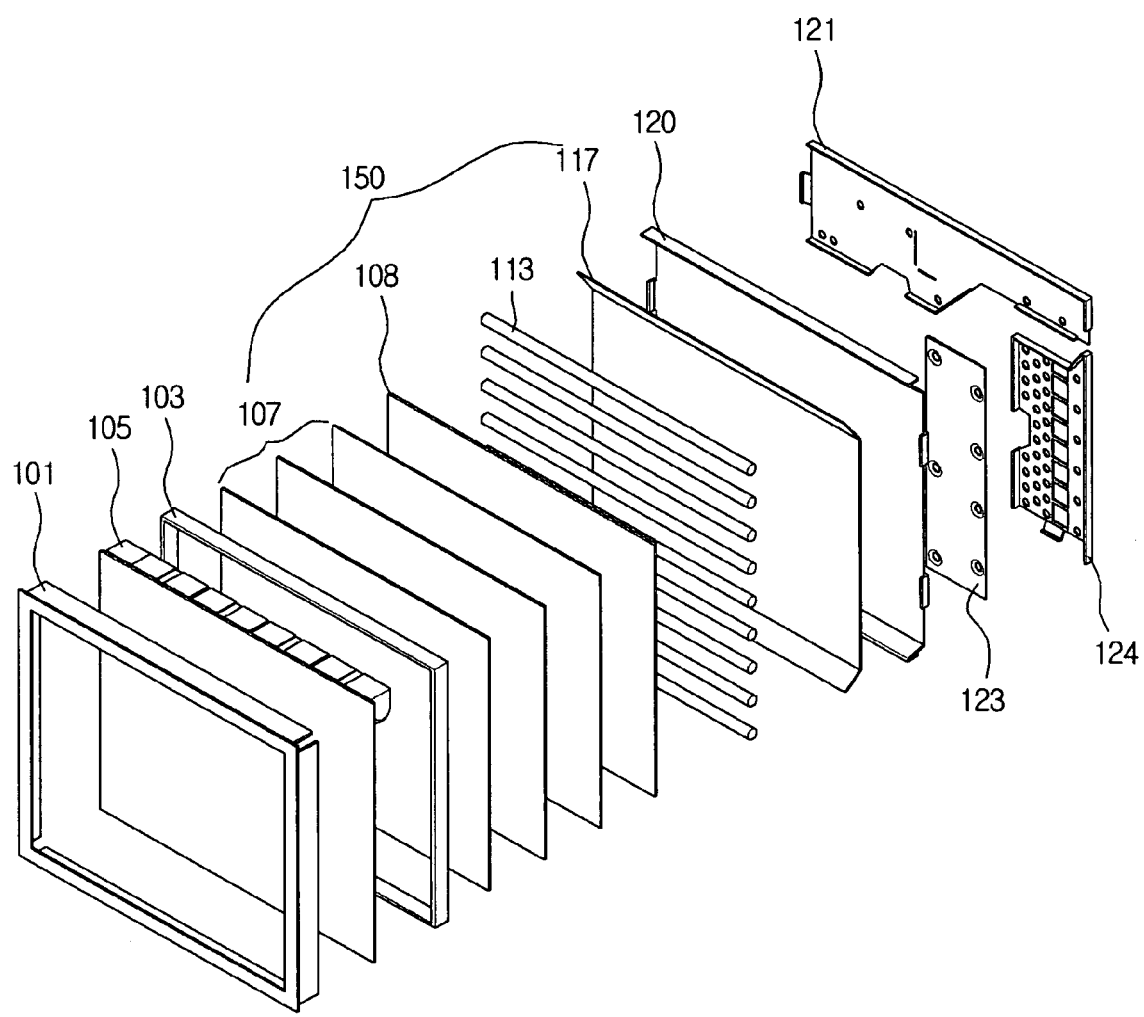
FIG. 1 is a perspective view of a direct-type LCD device according to the related art.
Figure 2:
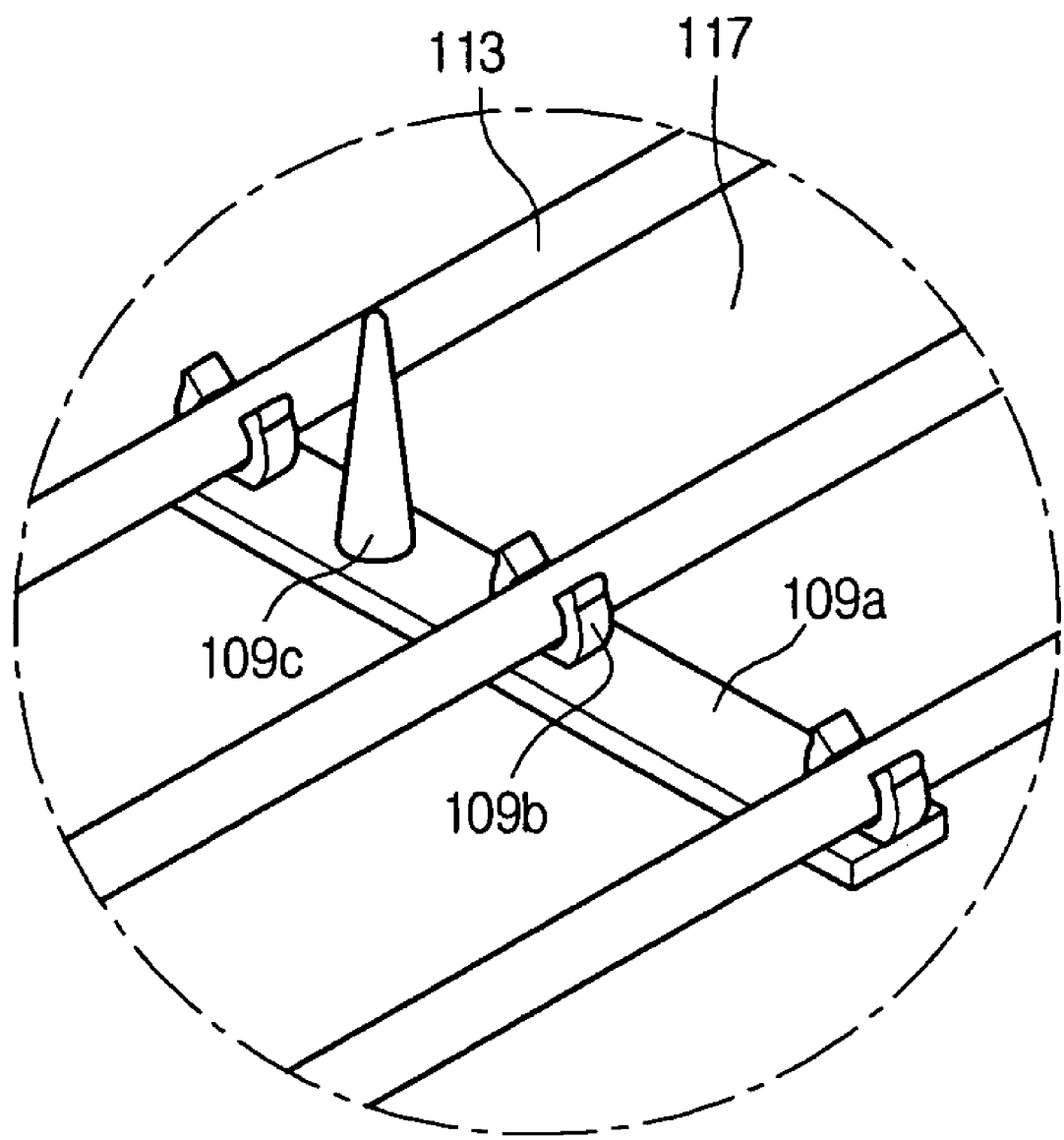
FIG. 2 is perspective view showing lamps fixed by lamp guides according to the related art.
Figure 3:
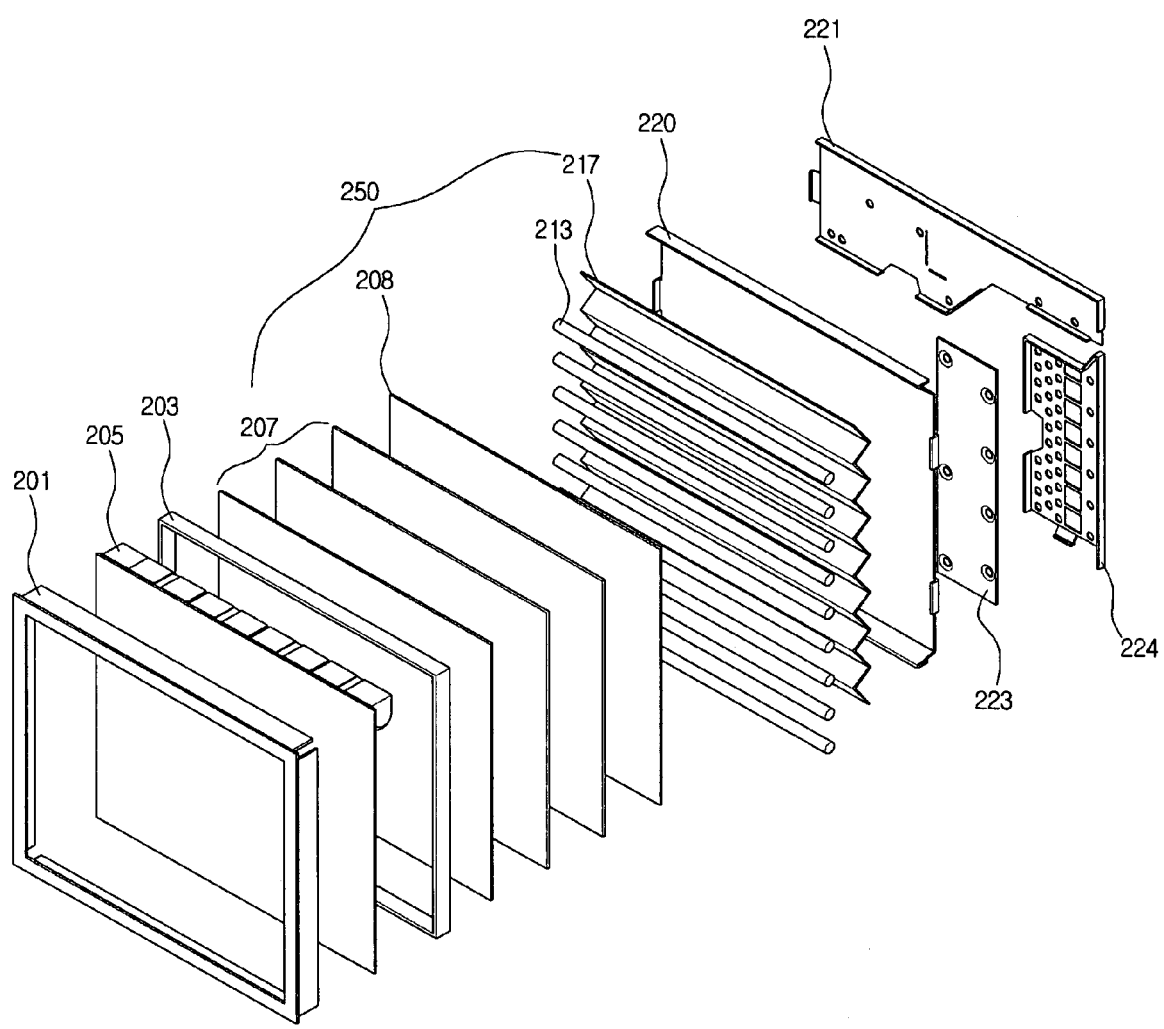
FIG. 3 is a perspective view of a direct-type LCD device according to one embodiment.

FIG. 3 is an perspective view of a direct-type LCD device according to one embodiment. Referring to FIG. 3, an LCD device according to one embodiment includes an upper substrate with a color filter formed or disposed thereon, an LCD panel 205 adjacent to a lower substrate forming a thin film transistor (TFT) and pixel electrodes, with a liquid crystal layer interposed between. A guide panel 203 affixes the LCD panel 205. An inverter 223 for supplying power is attached to the rear of the lower cover 220, an inverter cover shield 224 is disposed adjacent the inverter 223, and a cover shield 221 is provided to protect the LCD panel 205 and other components from ESD.

A backlight unit 250 emits light from below the LCD panel. A lower cover 220 stores the backlight unit 250, and an upper cover 201 assembled are coupled with the lower cover 220, for protecting the LCD panel 205 and the backlight unit 250. The backlight unit 250 includes a plurality of lamps 213 that emit light, a diffuser plate 208 and light diffuser sheets 207 disposed adjacent the plurality of lamps 213, for diffusing and focusing light.

A prism reflector 217 is disposed below or adjacent the plurality of lamps 213 to reflect light emitted towards the lower cover 220. The prism reflector 217 includes plurality of lamp guides (see FIG. 4) integrally or separately formed with the prism reflector 217, for guiding the plurality of lamps 213. The prism reflector 217 may include a series of ridges or inclined surfaces and corresponding declined surfaces or valleys that are configured to allow from the lamps 213 to be attached to the prism reflector 217. In one embodiment a lamp 213 is coupled with or fixed onto each of the declined surfaces or valleys of the prism reflector 217.

When the above prism reflector 217 is used light from the lamps 213 is reflected so that defects of dark regions do not occur, because there are prism peaks of the prism reflector 217 between the lamps 213. In other words, the inclined surfaces of the prism reflector 217 reflect the light emitted by the lamps 213 to increase lighting effectiveness and efficiency.

Figure 4:
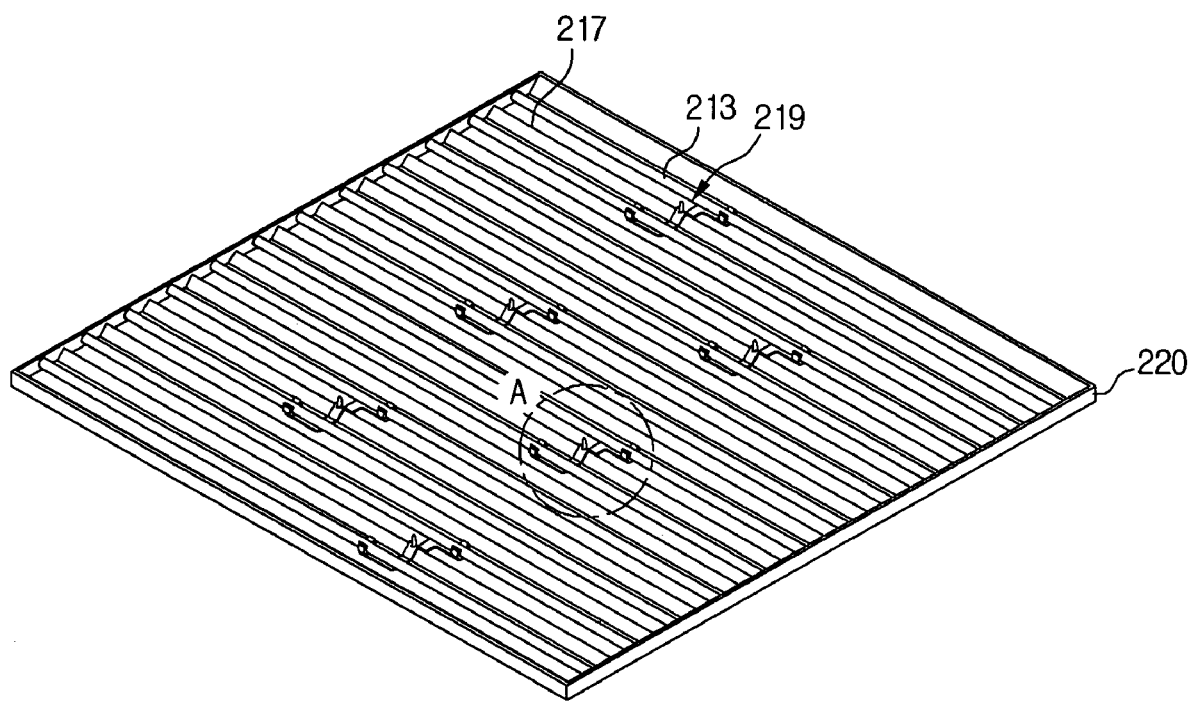
FIG. 4 is a perspective view showing lamps fastened on a prism reflector according to one embodiment.
Figure 5:
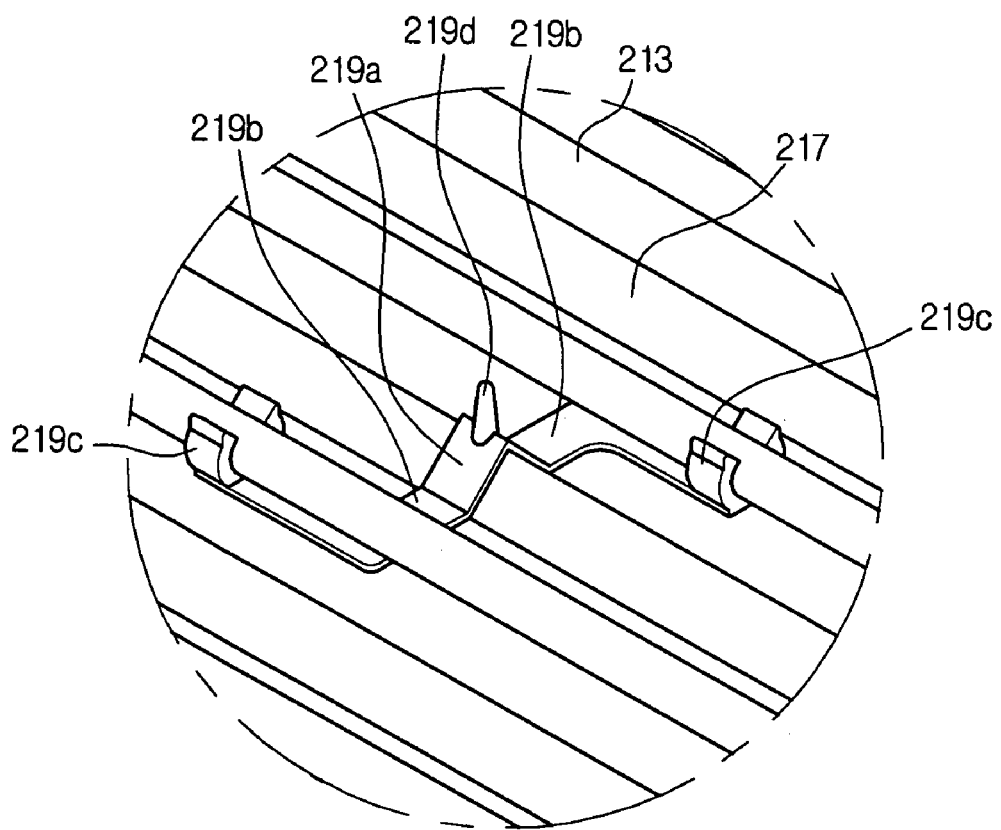
FIG. 5 is an enlarged perspective view of region A in FIG. 4.

FIG. 4 is a perspective view showing lamps 213 fastened on a prism reflector 217 according to one embodiment, and FIG. 5 is an enlarged perspective view of region A in FIG. 4. Referring to FIGS. 4 and 5, the prism reflector 217 forming a plurality of prism ridges is attached to the inner surface of the lower cover 220, and the lamps 213 are disposed between the prism ridges.

In order to fix the lamps 213 disposed on the prism reflector 217, lamp guides 219 are provided. As shown in FIG. 5, the structure of a lamp guide 219 includes the prism reflector 217, a supporting portion 219d for maintaining the diffuser plate above at a predetermined distance, a fastening portion 219a coupled with the supporting portion 219d and fastening to the prism peaks of the prism reflector 217. A connecting portion 219b is coupled with the fastening portion 219a, and a grip 219c is fixed on the connecting portion 219b, for fixing the lamp 213.

In one embodiment, the grip 219c is respectively disposed on the sides of the supporting portion 219d, the connecting portion 219b fixing the grip 219c on one side is disposed perpendicularly to the supporting portion 219d, and the other connecting portion 219b is disposed on the opposite side perpendicularly to the supporting portion 219d. This embodiment may prevent the position of the grip 219c from coinciding with the center of the supporting portion 219d and the fastening portion 219a, so that brightness is not noticeably reduced at the region where the grip 219c is. The supporting portion 219d may be disposed on the prism apex because light from a lamp 213 fixed by the lamp guides 219 requires a certain distance to mix with light from adjacent lamps to provide a surface light source with a uniform brightness.

Figure 6:
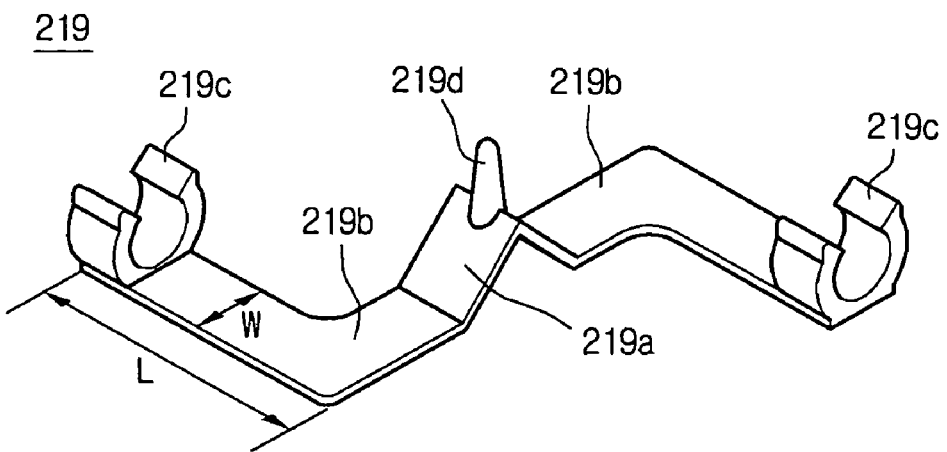
FIG. 6 is a perspective view showing the structure of a lamp-guide according to one embodiment.

FIG. 6 is a perspective view showing the structure of a lamp guide according to one embodiment. Referring to FIG. 6, a lamp guide 219 according to one embodiment has the supporting portion 219d formed on a fastening portion 219a protruding as a prism apex, and connecting portions 219b respectively formed substantially perpendicularly from descending directions on either side of the fastening portion 219a. In alternate embodiments, the supporting portion 219d may not be a prism apex, but could be other shapes, such as tubular, or rectangular. Likewise, the fastening portion 219a may be shaped differently, such as with a different slope or angle than shown in FIG. 6.

The grips 219c are formed on the connecting portions 219b to respectively fix the lamps. According to one embodiment, the grips 219c are respectively formed on each connecting portion 219b; however, this is only one example, and the grips 219c may be provided in plurality of locations or positions on each connecting portion 219b.

As shown in FIG. 6, a length L of the part of the connecting portion 219b that fixes the grip 219c, in the direction substantially parallel to the position of the lamp 213', may extend from a position that does not overlap the perpendicular central axis of the fastening portion 219a in both directions along up to half the width of the lower cover or the prism reflector 217. Also, a width W of a region of the connecting portion 219b parallel to the lamp 213 is formed to be equal to or less than the diameter of the lamp 213. If the width of the connecting portion 219b is greater than the diameter of the lamp 213, a shadow may be formed on the edges of the width of the connecting portion 219b. A shadow formed on the connecting portion 219b may cause the brightness of the backlight unit to be non-uniform.

Figure 7:
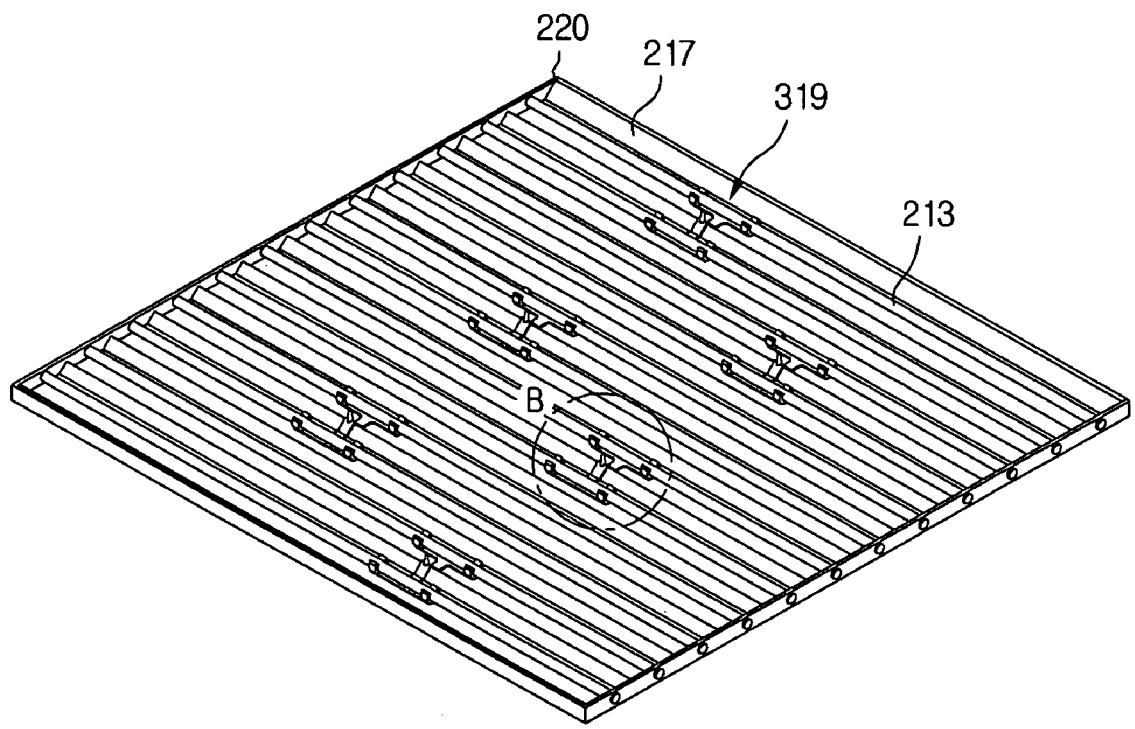
FIG. 7 is a perspective view showing lamps fastened on a prism reflector according to another embodiment.
Figure 8:
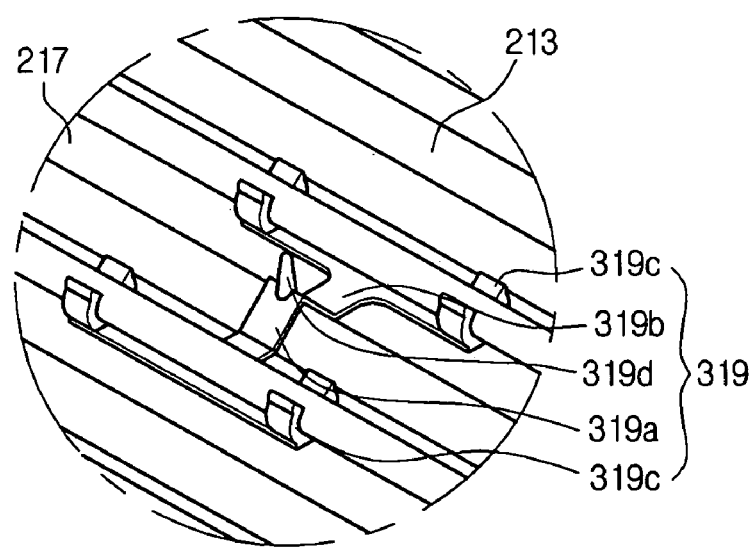
FIG. 8 is an enlarged perspective view of region B in FIG. 7.
Figure 9:
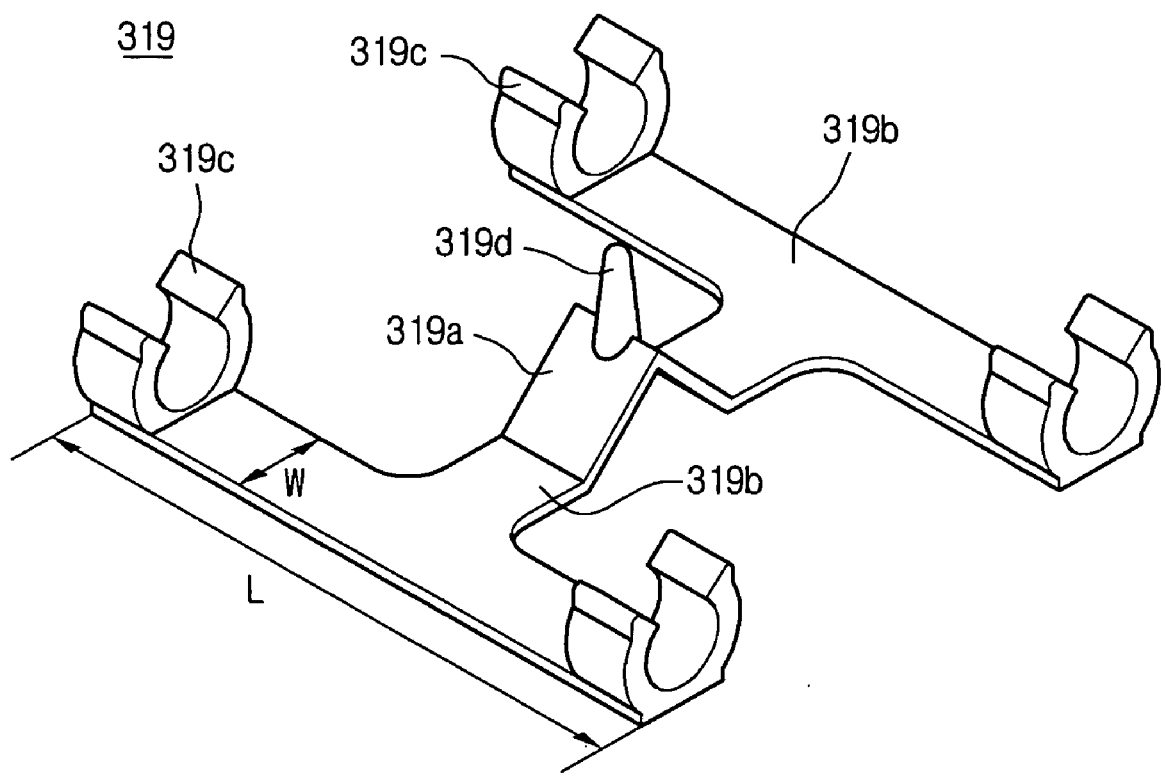
FIG. 9 is a perspective view showing the structure of a lamp guide according to another embodiment.

FIG. 7 is a perspective view showing lamps 213 fastened on a prism reflector 217 according to another embodiment. FIG. 8 is an enlarged perspective view of region B in FIG. 7. FIG. 9 is a perspective view showing the structure of a lamp guide according to another embodiment.

Referring to FIGS. 7 through 9, a prism reflector 217 with a plurality of peaks is attached to an inner surface of a lower cover 220, and lamps 213 are disposed between the peaks of the prism reflector 217.

To fix the lamp 213 disposed on the prism reflector 217, a lamp guide 319 is provided. The structure of a lamp guide 319 includes the prism reflector 217 on which lamps 213 are disposed. As shown in FIG. 8, the lamp guide may include a supporting portion 319d for maintaining the diffuser plate above at a predetermined distance, a fastening portion 319a for fixing the supporting portion 319d and fastening to the prism peaks of the prism reflector 217, and a connecting portion 319b respectively coupled with the fastening portion 319a in 'T' shapes in both up and down directions. The fastening portion 319a and the connecting portion 319b are an alternate embodiment of a structure for the lamp guide. Grips 319c are fixed on the connecting portion 319b, for fixing the lamp 313.

The grips 319c are disposed to the sides or above/below the supporting portion 319d at the center, so the connecting portion 319b in a 'T' shape that fixes the grips 319c are disposed in an upward direction relative to the supporting portion 319d. The 'T' shaped connecting portion 319b at the other end is disposed in an opposing direction. The grips 319c are respectively formed on the edges of the 'T' shaped connecting portions 319b. In one embodiment, the grips 319c for fixing the lamps 213 are not placed on the central axis of the supporting portion 219d and the fastening portion 219a, as shown in FIGS. 4 and 5. This embodiment may prevent a drop in brightness in the region of the grip 319c.

As shown in FIG. 9, length L from the part of the 'T' shaped connecting portion 319b that fixes the grip 319c, in the direction parallel to the position of the lamp 213 may extend from a position that does not overlap the perpendicular central axis of the fastening portion 319a in both directions along up to half the width of the lower cover or the prism reflector 217. A width W of a region of the connecting portion 319b parallel to the lamp 213 is formed to be equal to or less than the diameter of the lamp 213. This is because if the width of the connecting portion 319b is greater than the diameter of the lamp 213, a shadow may be formed on the edges of the width of the connecting portion 319b. A shadow formed on the connecting portion 319b may cause the brightness of the backlight unit to be non-uniform.

Figure 10:
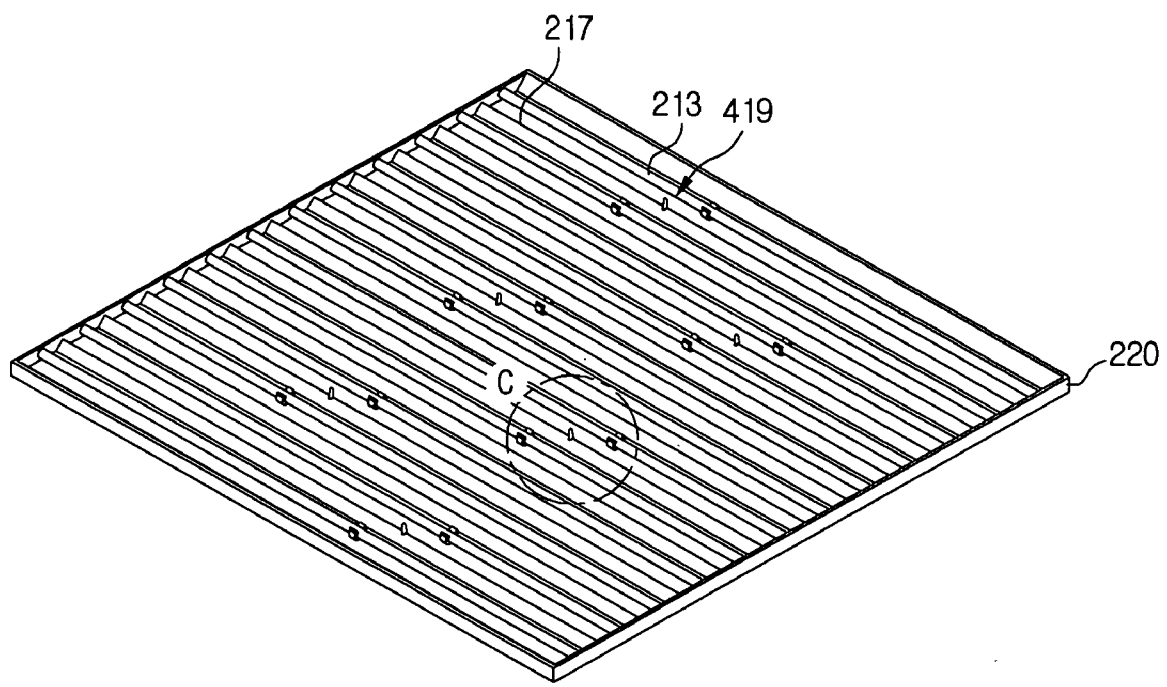
FIG. 10 is a perspective view showing lamps fastened on a prism reflector according to another embodiment.
Figure 11:
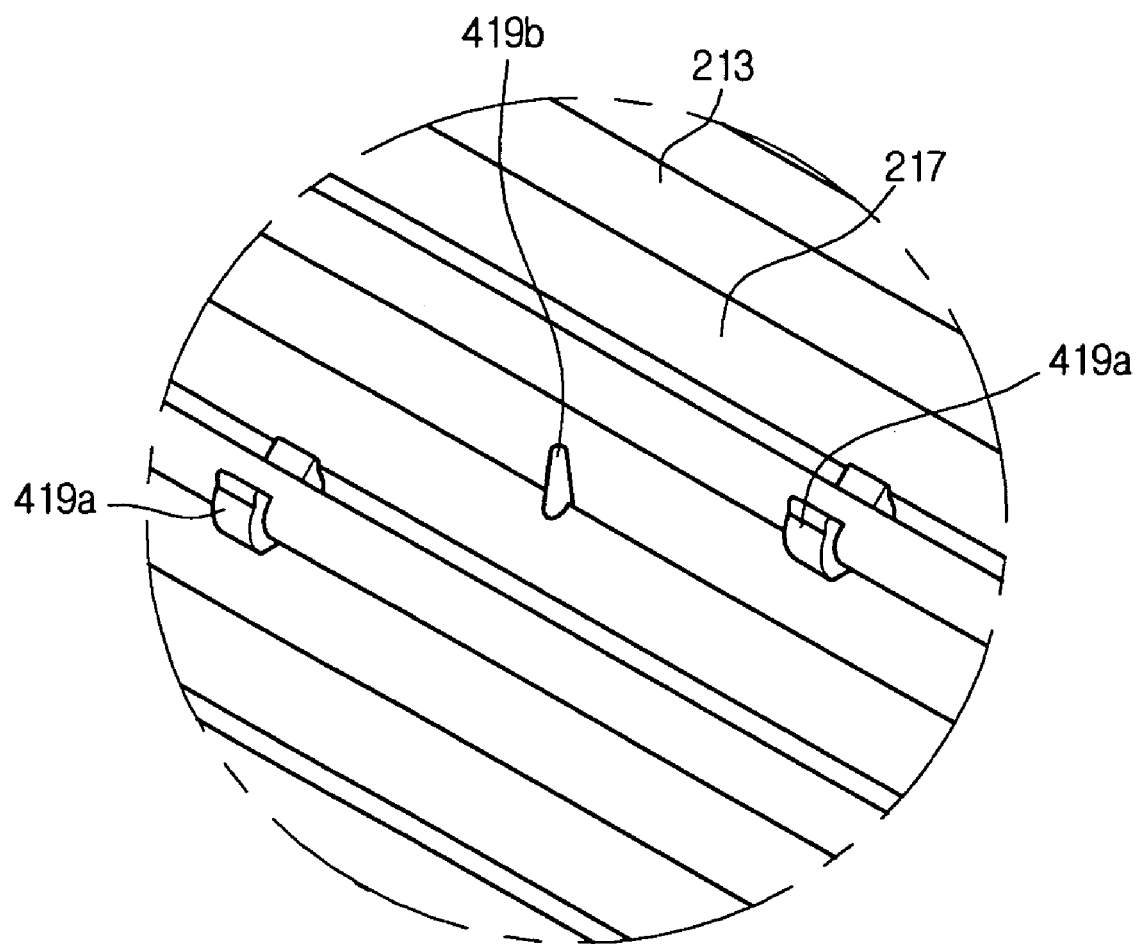
FIG. 11 is an enlarged perspective view of region C in FIG. 10.

FIG. 10 is a perspective view showing lamps fastened on a prism reflector according to another embodiment. FIG. 11 is an enlarged perspective view of region C in FIG. 10. Referring to FIGS. 10 and 11, a prism reflector 217 with a plurality of peaks is attached to an inner surface of a lower cover 220, and lamps 213 are disposed between the peaks of the prism reflector 217.

To fix the lamp 213 disposed on the prism reflector 217, a lamp guide 419 is integrally formed with the prism reflector 217. As shown in FIG. 11, the structure of a lamp guide 419 includes the prism reflector 217 on which lamps 213 are disposed, a supporting portion 419b for maintaining the diffuser plate at a predetermined distance, and grips 419a formed integrally with the prism reflector 217. The grips 419a may be to sides or above and below the supporting portion 419b at the center. The grips 419a may be integrally formed with the prism reflector 217 with the connecting portion and fastening portion removed from the lamp guide structure as shown in the embodiments of FIGS. 4 and 5 or FIGS. 7 and 8.

When the lamp guide 419 is thus integrally formed on the prism reflector 217, not only is there no need for an added lamp guide assembly process, but the lamp guide 419 can be injection molded together with the prism reflector 217, saving material costs. Although not shown in the diagrams, a lamp guide 419 may be formed on the prism reflector 217 with the fastening portion and the 'T' shaped connecting portion removed from the lamp guide structure as shown in FIGS. 7 through 9.

As described in detail above, the present embodiments include the formation of a reflective plate of an LCD device in a prism shape to prevent a reduction in brightness in regions between lamps. The structure of a lamp guide may be varied to be capable of fixing lamps on a prism reflector, so that the lamps are securely fastened. A lamp guide may be integrally formed on a prism reflector to improve ease of assembly and reduce material costs.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A backlight unit comprising:
    a plurality of lamps;
    a prism reflector including a plurality of prism peaks that positions the plurality of lamps; and
    a plurality of lamp guides that holds the plurality of lamps at a predetermined distance apart from one another,
    wherein at least one lamp guide from the plurality of lamp guides comprises:
    a fastening portion that fastens to one of the plurality of prism peaks of the prism reflector;
    a supporting portion disposed on the fastening portion;
    at least one or more grips that holds the lamps; and
    at least one or more L-shaped connecting portions integrally formed with the fastening portion, each having a first portion perpendicular to a length direction of the lamp and integrally formed with the fastening portion and a second portion parallel to the length direction of the lamp and supporting said lamp and integrally formed with the first portion, wherein the grips are disposed on the second portion of each connecting portion,
    wherein the connecting portions, the fastening portion and the grips are formed of a single body.

2. The backlight unit according to claim 1, wherein the grips are respectively disposed at a position adjacent to a central point of a perpendicular axis from the fastening portion and the supporting portion.

3. The backlight unit according to claim 1, wherein the connecting portion extends for at least one-half of a width of the prism reflector from the fastening portion and the supporting portion in a direction substantially parallel to the length direction of the lamps.

4. The backlight unit according to claim 1, wherein the connecting portion has a 'T' shape.

5. The backlight unit according to claim 1, wherein the connecting portion is a structure formed in parallel with the length direction of the lamp and perpendicularly in the length direction of the lamp from a bent point.

6. The backlight unit according to claim 1, further comprising a diffuser plate that diffuses or concentrates light emitted by the plurality of lamps.

7. A liquid crystal display device comprising:
    a liquid crystal display panel;
    a plurality of lamps coupled with the liquid crystal display panel;
    a prism reflector including a plurality of prism peaks for arranging the plurality of lamps; and
    a plurality of lamp guides that fixes the plurality of lamps at a predetermined distance from one another,
    wherein at least one of the plurality of lamp guides comprises:
    a fastening portion coupled with a prism peak of the prism reflector;
    a supporting portion disposed on the fastening portion;
    at least one or more grips that fixes the lamps; and
    at least one or more L-shaped connecting portions integrally formed with the fastening portion, each having a first portion perpendicular to a length direction of the lamp and integrally formed with the fastening portion and a second portion parallel to the length direction of the lamp and supporting said lamp and integrally formed with the first portion, wherein the grips are disposed on the second portion of each connecting portion,
    wherein the connecting portions, the fastening portion and the grips are formed of a single body.

8. The liquid crystal display device according to claim 7, wherein the connecting portions extend for at least one-half of a width of the prism reflector from the fastening portion and the supporting portion in a direction substantially parallel to the length direction of the lamps.

9. The liquid crystal display device according to claim 7, wherein at least one connecting portion of the connecting portions has a 'T' shape.

10. The liquid crystal display device according to claim 7, wherein the connecting portions are disposed in parallel with the length direction of the lamp and perpendicularly in the length direction of the lamp from a bent point.

11. The liquid crystal display device according to claim 7, further comprising a diffuser plate that concentrates light emitted from the plurality of lamps.

* * * * *